Oct. 29, 1940.        H. M. HIESTER        2,219,591
UNIVERSAL JOINT
Filed March 11, 1938        2 Sheets-Sheet 1
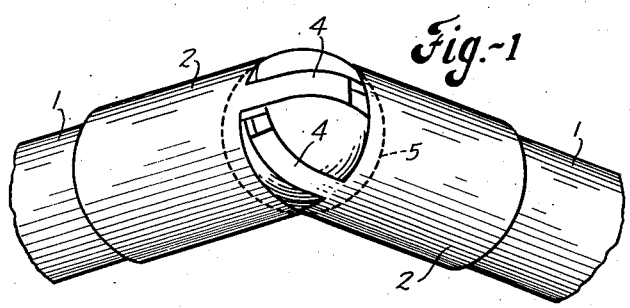
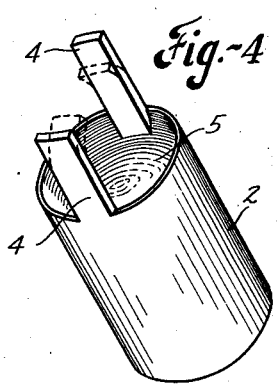
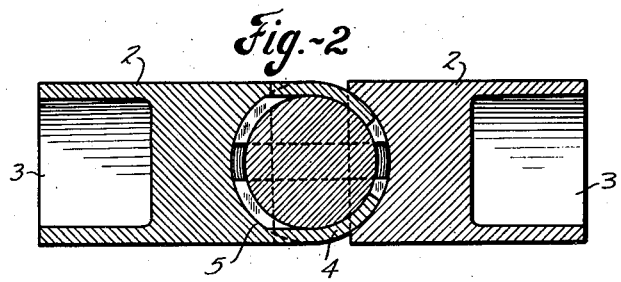
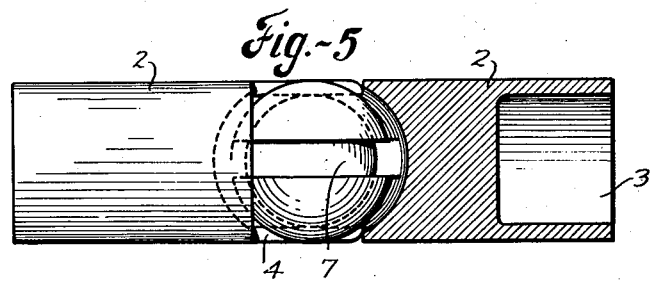
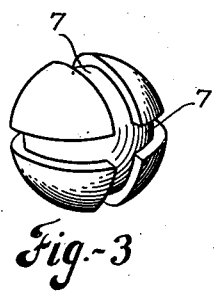
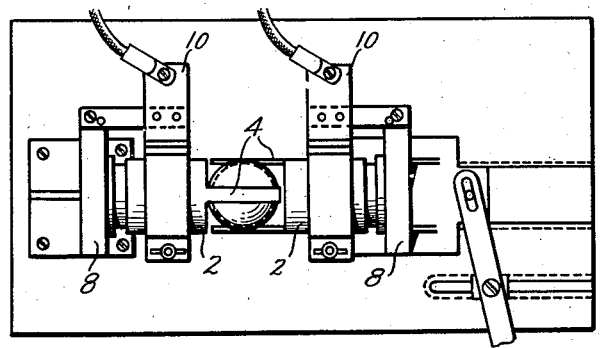

Oct. 29, 1940.   H. M. HIESTER   2,219,591
UNIVERSAL JOINT
Filed March 11, 1938   2 Sheets-Sheet 2

Inventor
Harry M. Hiester
By F. L. Walker
Attorney

Patented Oct. 29, 1940

2,219,591

UNITED STATES PATENT OFFICE 2,219,591

UNIVERSAL JOINT

Harry M. Hiester, Dayton, Ohio

Application March 11, 1938, Serial No. 195,333

11 Claims. (Cl. 64—16)

This invention pertains to flexible driving connections and more particularly to a universal joint and the method of assembly thereof.

The particular universal joint herein illustrated and described is of the ball and socket type wherein two shaft sections have rotative engagement with an interposed pintle member for swinging adjustment in transverse planes and by which they are interconnected for unison rotation throughout their range of angular adjustment.

The object of the invention is to improve the construction, as well as the mode of assembly, of universal driving connections, whereby they may not only be economically manufactured, but will be more efficient in use, free in operation, uniform in action, and unlikely to get out of repair.

A further object of the invention is to provide a flexible joint of simple construction, having few parts, easily assembled and non-detachable.

A further object of the invention is to provide a universal joint having maximum driving torque and minimum back lash or lost motion.

A further object of the invention is to provide a flexible joint suitable for precision control or driving operations, and which will have relatively large bearing surfaces and be subject to minimum wear.

A further object of the invention is to provide such joint capable of maximum end thrust resistance.

A further object of the invention is to provide a universal joint of permanently interconnected parts, so interlocked as to resist disconnection, accidental or intentional, and having no parts which may become loosened in use.

A further object of the invention is to provide a universal joint having the herein described advantageous structural features and meritorious characteristics, and the method of articulation of the parts and their assembly in operative relation.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein are shown the preferred, but obviously not necessarily the only forms of embodiment of the invention and the method of assembly, Fig. 1 is a perspective view of an assembled universal joint embodying the present invention.

Fig. 2 is a longitudinal sectional view thereof.

Fig. 3 is a perspective view of the pintle ball removed from the assembly.

Fig. 4 is a perspective view of one of the adjustably interconnected members detached from the assembly.

Fig. 5 is a side elevation partly in section of the assembled members preparatory to their permanent interconnection.

Fig. 10 illustrates a suitable press for assembling the parts in inseparable relation.

Like parts are indicated by similar characters of reference throughout the several views.

Figure 6:
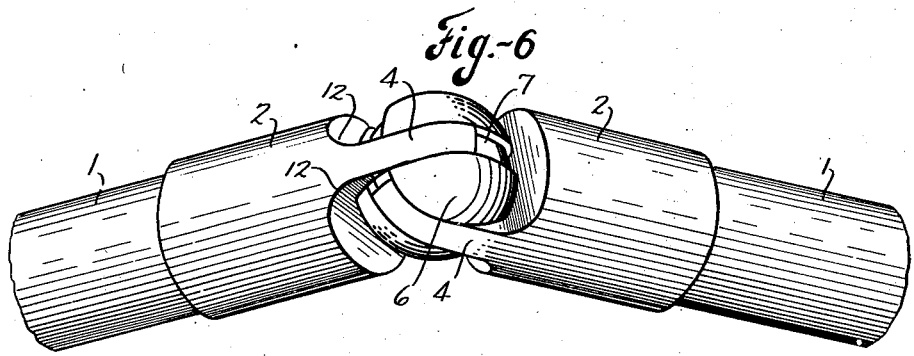
Fig. 6 is a perspective view of a modified construction having increased torsional driving engagement between the parts.

Referring to the drawings, 1—1 indicates a pair of shafts to be interconnected for unison rotation in various positions of angular adjustment. While the adjacent ends of the respective shafts may be contoured as herein described for direct interengagement with the pintle member, the engaging portions of the joint preferably comprise a pair of shaft heads 2—2, having axial bores or sockets 3 therein in which the ends of the shafts 1 are inserted and fixedly secured.

The shaft heads 2 are each bifurcated, the furcations 4 of which extend therefrom longitudinally at diametrically opposite points. These fingers 4 are initially straight and parallel with each other and are relatively wide circumferentially of the members 2. Subsequently, as hereafter described, these furcations or fingers 4 are inturned about the pintle ball as shown by dotted lines in Fig. 4. Intermediate the furcations 4 the terminal faces of the shaft heads 2 are spherically concaved as at 5 to form a ball socket or seat for the pintle ball 6. This pintle member comprises a one-piece sphere having a diameter substantially equal to that of the members 2 to be interconnected. Extending transversely about the sphere are equatorial uniformly concentric grooves 7 in perpendicular planes.

The furcations 4 and concave seat 5 may be formed directly upon and integral with the ends of the shafts 1. However, for commercial production their formation on heads 2 engageable on the ends of the shafts is preferable.

The shaft heads 2 are initially axially aligned in reverse relation, with their respective furcations 4 in overlapping relation in transverse planes, as is shown in Fig. 5.

Intermediate the concave terminal faces 5 of the reversely disposed members 2 and between the overlapping furcations 4 thereof, is positioned in the pintle ball 6 within the transverse intersecting circumferential grooves 7, of which the furcations 4 of the respective members 2 have tangential engagement.

The grooves 7 are substantially the same width as the fingers 4 and their depth is substantially equal to the thickness of such fingers, which fit closely but movably therein. The radii of the pintle ball 6 and of the spherically concave seats 5 are also substantially equal so that in the final assembled relation the pintle ball has rotative seating engagement simultaneously in the seats or sockets 5 of both members.

The seats 5, however, are of duo-functional character. In addition to providing seats for the pintle ball 6 they also function as forming or curling dies for contracting the furcations 4 of the respective members into close conformity with the bottoms of the transverse grooves 7 of the pintle 6.

The parts being positioned as shown in Fig. 5, contractive pressure is applied to the opposite ends of the assembly, causing the ends of the furcations of each member, which previously have been slightly beveled, to be forcibly thrust against the concave seat 5 of the opposing member by the camming action of which the terminals of the furcations are simultaneously bent inwardly into grasping engagement about the pintle ball 6 in their grooved seats 7.

To facilitate such forming action the fingers 4 are preferably heated sufficiently to render them malleable without, however, destroying the temper of the material when cooled. This may be done in various ways. A convenient method is that of electrically heating the fingers 4 by connecting the furcations of the respective members into an electrical circuit, wherein the fingers being of high resistance will heat to such temperature that they are easily formed, after which they are quenched, to restore and maintain their temper. In Fig. 10 there is shown for illustrative purpose only, but with no intent to limit the invention, a press wherein the members 2 are engaged with supporting heads 8, one of which is adjustable relative to the other by means of an operating lever 9. The members 2 are connected with electrical conductors 10 by which the current is circulated from one member 2 to the other. The fingers 4 through which the current flows from one member to the other being relatively small, as compared with the main bodies of the members 2 and with the pintle ball, will heat more quickly and to greater degree. When heated sufficiently the approach of the press heads 8 under influence of the lever 9 forces the fingers 4 within the seats 5 and about the ball 6 as heretofore described. The assembly may be surrounded by a heater coil and heated by induction, or if desired by direct application of flame thereto.

It has also been found that the furcations or fingers 4 may be pre-shaped and heat treated before assembly. The curved fingers 4 will then possess sufficient inherent resiliency that, being positioned at opposite sides of the pintle ball in the grooves 7 thereof and subjected to compression, they may be sprung around the ball and will snap into place. Once so engaged they will resist any ordinary force tending to separate them. When engaged with the pintle ball the fingers fit the grooves 7 substantially flush with the spherical face of the ball and their curved extremities conform to and seat upon the concave surfaces 5 coincident with contiguous areas of the pintle ball. The fingers 4 do not, however, ordinarily meet beyond the ball, although if suitably proportioned they may be made to do so.

Figure 7:
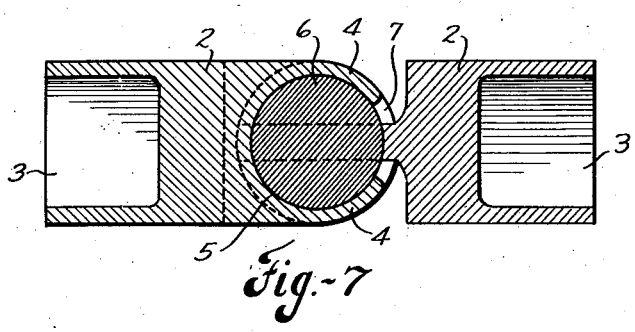
Fig. 7 is a sectional view and Fig. 8 a side elevation thereof.
Figure 8:
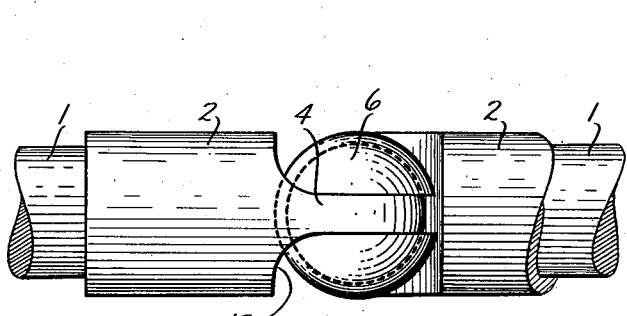
Figure 9:
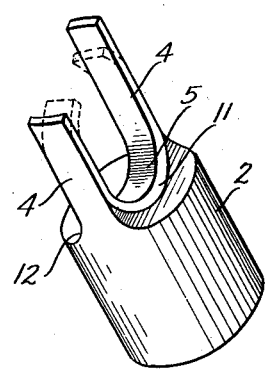
Fig. 9 is a perspective view of one of the members to be adjustably interconnected, detached from the assembly illustrated in Fig. 6.

In Figs. 6 and 7 there is shown a modification wherein in lieu of the concave seats 5 on the contiguous terminal faces of the respective members 2 the fingers 4 are interconnected across the terminal faces of the members by integral arcuate ribs 11 engageable in the grooves 7 of the ball 6. Such continuing bight portion 11 connecting the fingers 4 affords therewith an uninterrupted rotary driving engagement throughout approximately three-fourths of the periphery of the pintle ball. This very greatly increases resistance to the torque transmitted from one member 2 to the other. In such construction the fingers 4 are formed with fillets 12 at their junctures with the members 2 beyond the limits of the ball, thereby greatly increasing the strength and driving power of the connections. In such assembly the extremities of the arm are contracted by a suitable tool after being positioned about the ball, or are pre-formed as before described and sprung into position against the inherent resiliency of the fingers.

Either construction, as described, affords a tongue and groove connection between the respective members and the interposed pintle ball, wherein the members are capable of free independent relative adjustment in directions coincident with such tongue and groove engagements exerting positive driving influence transversely of such tongue and groove formations. The joint comprises a minimum number of parts, i. e., but three members, to-wit, the respective driving and driven members 2 to be flexibly connected and the interposed pintle member 6. No screws, bolts, rivets or other fastening devices, which might become loosened or lost, are necessary. There are no pins or small bearings to wear rapidly. To the contrary, the bearing surfaces are relatively large and the torque transmission is direct and positive with little or no lost motion or back lash. The seating of the pintle on the respective members is such as to easily resist high compression loads.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A universal joint including a pair of members to be interconnected, each having in their contiguous faces spherical depressions and a pair of integral furcations disposed in a common plane projecting from each member, the furcations of the respective members being in planes perpendicular to each other, and an integral spherical member, having uniformly concentric transverse circumferential grooves thereabout, straddled by the furcations of the respective members, with one pair of furcations in each circumferential groove of the spherical member, the free ends of the furcations being inturned into conformity with the grooves in the ball and within the spherical concave seat of the opposing member.

2. A universal joint including a pair of bifurcated members including integral furcations, a spherical concave seat between the furcations of each member thereof and an integral ball having therein uniformly concentric transverse peripheral grooved seats within which the furcations of said members engage in straddle relation, the ends of the furcations being inturned into conformity with the grooved seats in the ball and within the concave seat of the opposing member.

3. The herein described method of assembling a universal joint wherein a ball having therein transversely peripheral grooves is grasped between two pairs of oppositely disposed inturned furcations carried by opposing members to be universally interconnected including initially forming relatively straight furcations on the respective members and spherically concave seats therebetween, assembling the bifurcated members in opposing aligned relation with the ball therebetween and the furcations of the members in the transverse peripheral grooves thereof, and subjecting the members to pressure on toward the other whereby the free ends of the furcations are curled about the ball within the peripheral grooves thereof by their engagement with the concave seats of the opposing members which function initially as forming dies, and subsequently as ball sockets for rotatable engagement of the ball.

4. A universal coupling including a pair of reversely disposed bifurcated shaft heads the furcations of which are integral therewith, spherically concave seats formed intermediate the furcations of the respective shaft heads and disposed in concentric spaced relation, a spherical one-piece pintle body having rotative seating engagement simultaneously in the concave seats of both shaft heads and having therein uniformly concentric transverse peripheral grooves in planes substantially perpendicular one to the other in which the furcations of the respective shaft heads are seated for relative swinging adjustment of the shaft heads about the center of the spherical pintle.

5. The herein described method of assembling the members of a universal joint wherein a pair of reversely disposed bifurcated members have tongue and groove driving connection with an interposed pintle member in various positions of relative angular adjustment thereof including the steps of pre-forming the furcations by bending their extremities into approaching curvilinear formation, position the bent furcations in the groove of the pintle and subject the members to pressure thereby forcing the bent furcations apart and springing them into engaging relation about the pintle.

6. A universal coupling including a pair of reversely disposed bifurcated members the furcations of which are formed integrally therewith and disposed in overlapping relation in intersecting planes, and an integral spherical pintle member having uniformly concentric transverse circumferential grooves therein interposed between the overlapping furcations with said furcations seated in the grooves of said spherical pintle portions of the furcations being exteriorly flush with the surface of the spherical pintle and concave bearing seats formed on the contiguous faces of the respective members on which the spherical pintle and portions of the furcations of the opposing member have rotatable thrust engagement.

7. The herein described method of assembling a pair of bifurcated members each having a concave seat contiguous to the base of its furcations in reverse overlapping relation with a pintle member interposed within the furcations and intermediate the concave seats, including subjecting such assembly simultaneously to the influence of heat and axial compression by which the heated furcations of each member are forcibly pressed against and into conformity with the concave seat of the opposing member and about the pintle member.

8. The herein described method of assembling a pair of bifurcated members each having a concave seat contiguous to the base of its furcations in reverse overlapping relation with a pintle member interposed within the furcations and intermediate the concave seats, including connecting the assembly into an electrical circuit wherein current is circulated from one member to the other through the furcations thereof by which the furcations are heated to malleable condition and thereafter moving the members one toward the other to compress the furcations between the concave seats into conformity therewith and about the pintle member.

9. The herein described method of assembling a pair of bifurcated members each having a concave seat contiguous to the base of its furcations in reverse overlapping relation with a pintle member interposed within the furcations and intermediate the concave seats, including electrically heating the overlapping furcations to a malleable condition and thereafter moving the members one toward the other to compress the furcations between the concave seats into conformity therewith and about the pintle member.

10. The herein described method of assembling the members of a universal joint including utilizing preformed seats upon relatively adjustable opposing members as forming dies for shaping contiguous portions of the opposing member into grasp engagement with an interposed pintle member and thereafter utilizing said seats as bearings for the pintle member.

11. The herein described method of assembling the members of a universal joint including utilizing opposing spherically concave surfaces on relatively adjustable opposite members initially as forming dies for shaping contiguous portions of the members into grasp engagement with an interposed spherical pintle member and thereafter utilizing said concave surfaces as ball socket bearings for the spherical pintle member.

HARRY M. HIESTER.